Patented Dec. 30, 1952

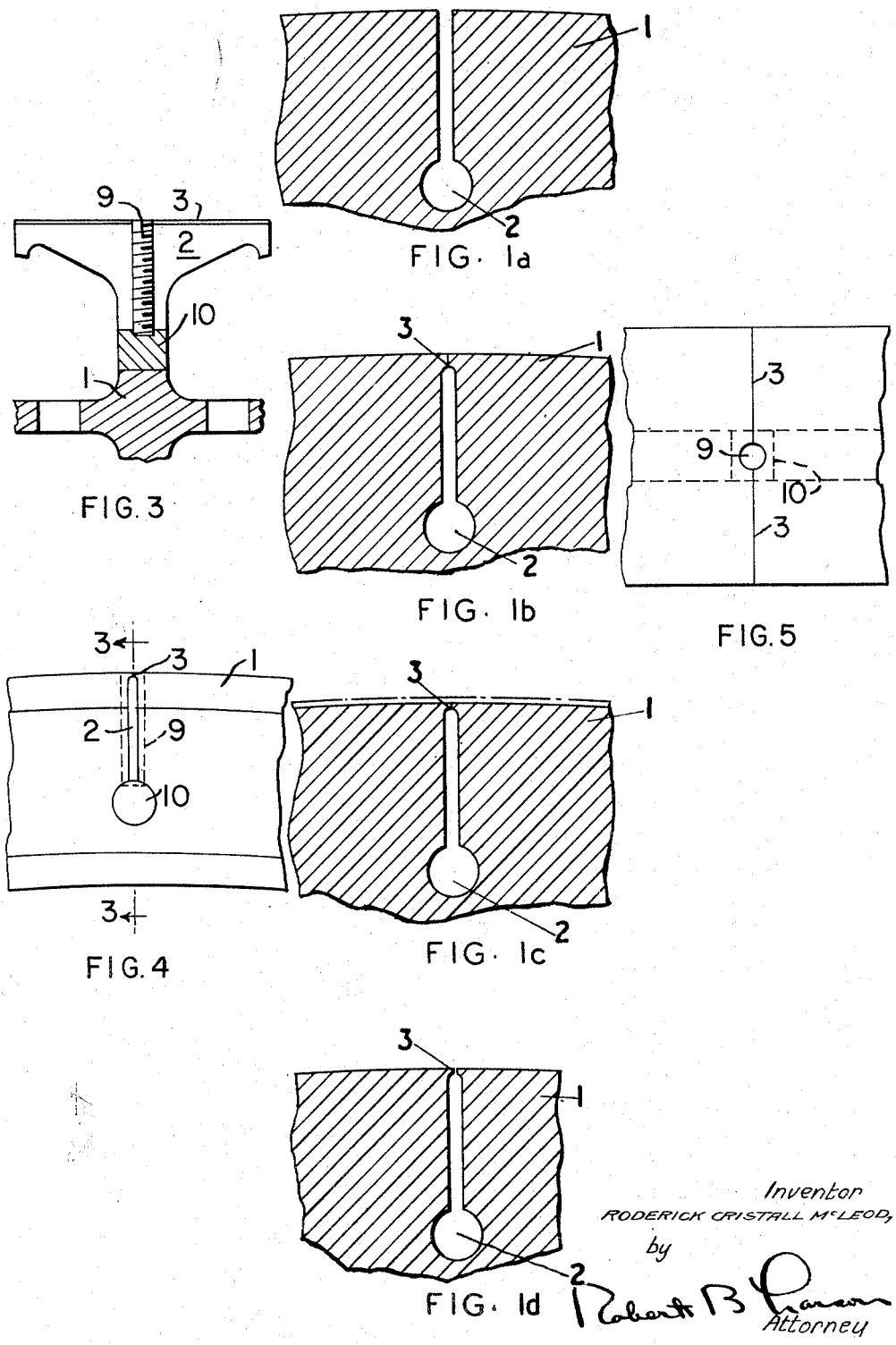

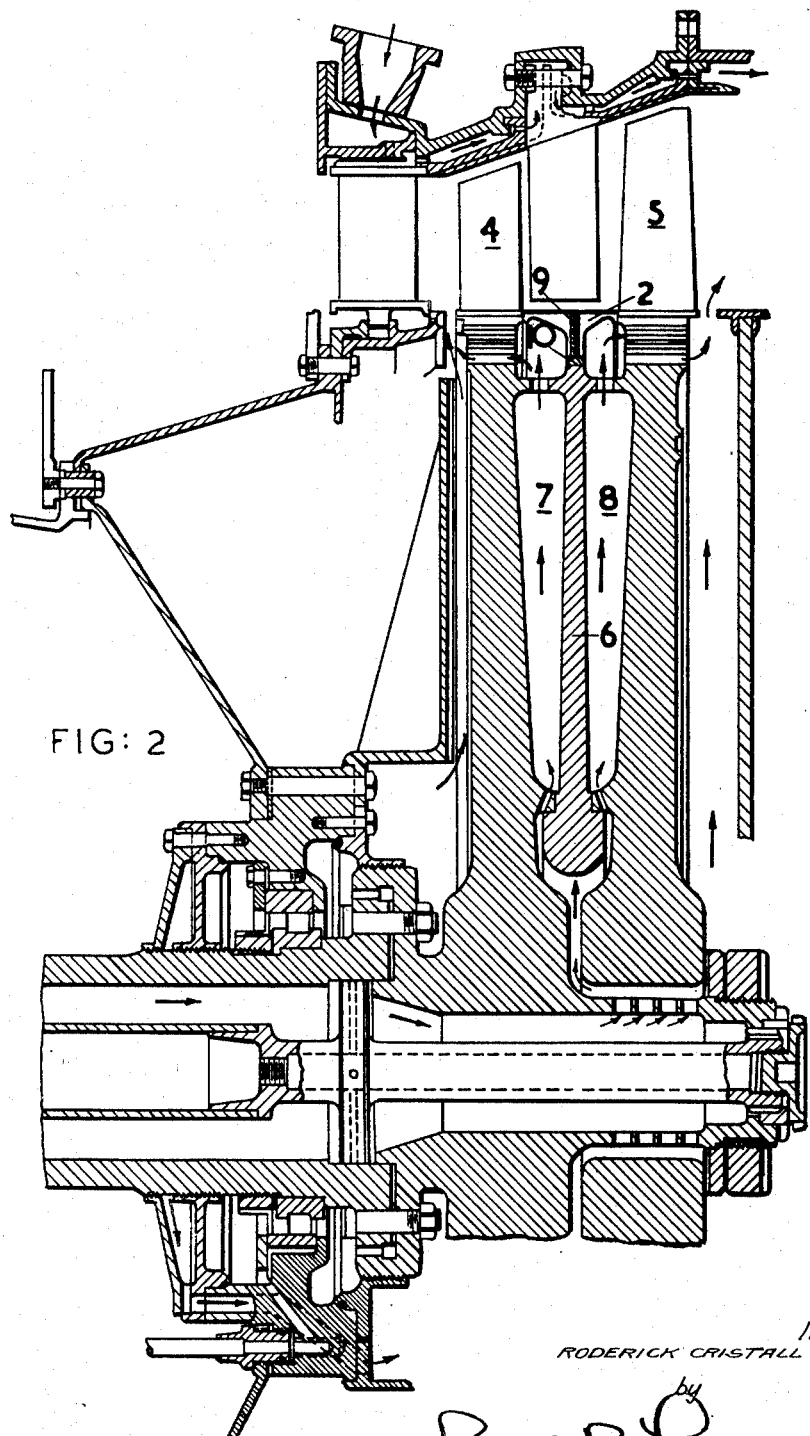
FIG: 2

2,623,727

UNITED STATES PATENT OFFICE 2,623,727

ROTOR STRUCTURE FOR TURBINES AND COMPRESSORS

Roderick Cristall McLeod, Cropston, Leicester, England, assignor to Power Jets (Research & Development) Limited, London, England Application April 26, 1946, Serial No. 665,106
In Great Britain April 27, 1945

11 Claims. (Cl. 253—39.15)

This invention relates to the construction of and method of making metal bodies which are required to be subject to differential surface and internal temperatures liable to cause mechanical stress in a surface region thereof due to differential thermal expansion, and has particular reference to such metal bodies as rotors or the like of, for example, turbines or compressors, including turbine or other discs or wheels which are required to be subjected to other than thermal stresses of a high order and to thermal conditions which may contribute materially to the problem of withstanding stresses. A case in which the type of thermal expansion problem envisaged is particularly acute, and in which the invention has special utility, is that of a non-bladed circular element which is to form part of the rotor of a gas turbine, being for example a spacing element between two blade-carrying discs, and whose rim forms the floor of the turbine annulus and is consequently subjected to elevated temperatures. Another such case is that of a similar rim-like structure when embodied in an axial flow compressor. In such structures the problem is met that if unduly high stresses are to be avoided, which stresses may be in addition to centrifugal loads, allowance has to be made for thermal expansion of the material of the rim. The problem is the more acute in the case of the non-bladed parts of turbine, compressor, and like rotors, by reason of the lack of any capacity for expansion such as may be afforded by slackness of the blade root mountings in the case of bladed parts. I have also observed that the problem is made more difficult in turbines, compressors, and the like by the desirability of presenting a smooth and substantially gas-tight peripheral surface, which precludes the mere provision of radial gashes such as would permit sufficient freedom for expansion. The present invention seeks to afford a solution of the thermal expansion problems described, more particularly, though not exclusively, in their relation to turbine or compressor rotors whilst enabling a smooth surface to be achieved which will be substantially gas-tight in the conditions of use.

With the foregoing object in view, the invention provides a metal body such as a turbine rotor rim which is required to be subject to differential surface and internal temperatures liable to cause mechanical stress in a surface region thereof due to differential thermal expansion, having means for reducing the incidence of such stress comprising at least one slot extending into the body from said surface and lying transversely to the direction of the expansion to be accommodated, the mouth of said slot having closure means, effective at least in the expanded condition of the body, adapted to accommodate a condition of expansion beyond a predetermined limit by deformation in response to mechanical stress induced by that condition.

According to a further feature of the invention, the slot closure means includes an inwardly turned lip along one side at least of the slot mouth, said lip, at least in a predetermined condition of expansion of the body, making contact with the other side of said mouth to close the slot, and being adapted, if subjected to mechanical stress by reason of expansion when making such contact to be deformed in order to accommodate such stress. In this latter connection, an important further feature of the invention consists in so making and arranging the lip that it will undergo permanent plastic deformation by crushing in the condition of expansion; in this way, after being once in use, the lip will be exactly large enough fully to close the slot mouth in the conditions of use without, however, transmitting any mechanical stress across the slot, whilst by making the lip of a suitably fragile nature no unacceptable stress need be transmitted in the initial crushing operation.

A further important feature of the invention is the method employed for making a body in accordance with the invention, in which, before being machined to its final limits, and having been formed as by drilling and sawing with keyholed slots lying transversely to the direction of the expansion to be accommodated, the rim of the slot mouth is deformed so as to close it at least sufficiently for its edges to contact one another when a predetermined condition of expansion arises. Preferably the deformation is effected by a hammering, rolling, or like impact process, the result of which is to form an inwardly extending lip along each side of the slot. Preferably the body is subsequently machined to its final limits so as to reduce the thickness of the lip without, however, destroying it. In this way, the slot may be left closed, or partly closed, by a very thin wall which is incapable of sustaining the stress arising from expansion of the rim and will be crushed when the first expansion takes place. Strictly it is only necessary, of course, to close the slot sufficiently for its edges to make contact in the expanded condition, but in practice the slot is made very narrow and the simplest course is to close it completely by the deforming operation.

It will be appreciated that although, for the purpose of discussion and definition, a single slot has been considered, several slots will usually be provided in the one body.

In order that the invention may be clearly understood and readily carried into effect reference will now be made to the accompanying drawings which illustrate both the preferred method of manufacture of the invention and an example of its application, and in which:

Figures 1, (a), (b), (c) and (d), illustrate diagrammatically successive stages in the formation of a stress-relieving slot and its closure in accordance with the invention;

Figure 2 is an axial half section of an internal combustion turbine having a composite rotor of a kind to which the invention has particular application;

Figures 3, 4 and 5 are respectively a fragmentary axial section, side elevation, and plan view to an enlarged scale of the rim of the spacing element of the turbine rotor illustrated in Figure 2.

Referring to Figure 1a of the drawings, 1 represents the high temperature surface region of a body whose surface is to be subjected to higher temperatures than its internal parts and may be assumed to be the rim of, say, a turbine rotor element. The body 1 is drilled and gashed, as by a sawcut, to form a keyhole slot 2 extending into the body from the high temperature surface thereof (the width of the slot is exaggerated in the drawing in the interests of clarity). The high temperature surface is to be presumed to be only rough-finished. The surface is now hammered or rolled to burr over the edges of the slot mouth and form inwardly extending lips 3 which close the mouth of the slot (Figure 1b) and finally is machined to its finished limits (Figure 1c), thus reducing the thickness of the lips 3 by the amount indicated by the chain-dotted line, this amount being again exaggerated for clarity. The final machining is not, however, taken so far as to destroy the lips 3, which remain as relatively fragile elements. If now there is expansion in the surface region, it may take place without undue stressing of the structure due to the freedom allowed between adjacent sections of the body by virtue of the presence of the slots, which freedom is not appreciably affected by the resistance to relative expansion of the lips 3, which are crushed upon such expansion by an amount exactly corresponding to the amount of the expansion. When the body again cools, the lips 3 will no longer meet to close the slot (see Figure 1d), but in the condition of use the slot will always be closed; this characteristic is acceptable in turbine and compressor practice since the expanded condition in which the slot is closed arises almost immediately, particularly in the case of a turbine.

In the practical embodiment of the invention given in Figures 2 to 5, the turbine has a composite two-stage rotor comprising bladed wheel elements 4, 5, forming a unit with a spacing annulus 6. The detailed construction of this rotor, as set forth in my copending application Serial No. 674,229, filed June 4, 1946, need not be considered for present purposes except to observe that the rim of the spacing annulus 6 forms the floor of the turbine flow annulus, and is in this case the body to be provided with stress-relieving means, and that the spacing annulus 6 also serves to divide the space between the wheel elements 4, 5, into separate air passages 7, 8, through which compressed air is fed to outlets in the blade root mountings and thence by way of the clearances at the front and rear of the rotor to the working fluid stream, the object being to prevent leakage from the working stream at these points and also to cool the rotor. The internal cooling of the rotor accentuates the problem of differential expansion at the rim; this problem, however, may only require attention in the case of the spacing element 6, since the slight slackness normally existing between the blade roots and their seatings in the wheels 4, 5, may allow sufficient latitude for expansion in these parts. The problem of applying the stress-relieving slots is complicated by the fact that, since the pressures at the turbine inlet and outlet are different, it is desirable that the supply of compressed air to prevent inward leakage should be appropriately different in the two passages 7, 8. It is necessary, therefore, in such a case, that the stress relieving slots should be so applied as not to offer any communication between the passages 7, 8, which would lead to a leakage from the high to the low pressure side. With this difficulty in mind, the T-shaped rim of the spacing annulus 6 has radial expansion slots 2 (see particularly Figures 3 to 5) formed at appropriate intervals around its periphery in the manner already described with reference to Figures 1a, b, c, d, and, in order to prevent lateral communication between opposite ends of the slots, each is drilled in the radial direction after the formation of the closure lips and tapped to receive a loosely fitting grub screw 9 (serving as a barrier insert) whose upper end is arranged to be flush with the rim surface. In addition, the keyhole portion of the slot is filled by a plug 10 which has a recess engaged by the screw 9, thus completing the seal and simultaneously locking the plug 10 against displacement laterally of the slot.

Where communication between opposite ends of the slots is not objectionable, the slots may be used as channels for the passage of a coolant, the fact of their outer ends being closed rendering this practicable.

The slots may, of course, be skewed in relation to the plane of rotation and it is not necessary that they be radial providing they are in a generally radial sense.

I claim:

1. A method of manufacturing a turbine rotor rim which is required to be subject to differential peripheral and internal temperatures liable to cause mechanical stress in the peripheral region thereof due to thermal expansion, so as to reduce the incidence of such stress, which includes the step of so deforming the margin of the mouth of a radially-axially disposed slot extending into the rotor from its periphery, as to close said mouth at least sufficiently for its edges to contact one another when a predetermined condition of expansion arises.

2. A method of manufacturing a turbine rotor rim, as claimed in claim 1, wherein the step of deformation produces at the mouth of the slot a lip adapted to be permanently deformed when subjected to mechanical stress induced by expansion of the rotor.

3. In a composite rotor for a turbine, compressor, or the like normally operating in a particular temperature range, a bladed rim section, a non-bladed rim section forming part of the rotor surface, said non-bladed rim section having slots at its periphery each of which extends radially and axially for relieving thermal stress in said rim, each of said slots having an inwardly turned deformable lip along at least one side of its mouth, said lip making contact with the other side of said mouth to close said slot during normal operation of said rotor, said deformable characteristic providing accommodation to abnormal operating conditions and stresses.

4. In a composite rotor for a turbine, compressor, or the like normally operating in a particular temperature range, at least two axially spaced rotor elements each having a bladed rim section, an intermediate rotor element having a non-bladed spacing rim section which forms the rotor surface between said bladed sections, said non-bladed rim section having at its periphery radially-axially disposed slots adapted to relieve thermal stress in said rim, each of said slots having an inwardly turned deformable lip along at least one side of its mouth, said lip making contact with the other side of said mouth to close said slot during normal operation of said rotor, said deformable characteristic providing accommodation to abnormal operating conditions.

5. A composite rotor for a turbine, compressor, or the like, comprising at least two axially spaced rotor elements each having a bladed rim section, an intermediate rotor element having a non-bladed rim section which forms the rotor surface between said bladed sections, said non-bladed rim section having at its periphery radially-axially disposed slots for relieving thermal stress in said rim, and having an inwardly directed web dividing in a plane of rotation the space between said bladed rotor elements and defining therewith axially separated cooling air chambers beneath said non-bladed rim section, means to supply air under pressure to each of said chambers, and means to discharge said air through said respective bladed sections.

6. A composite rotor as claimed in claim 5, further comprising sealing means extending depthwise into said slots to cut off lateral communication between said chambers.

7. In a composite rotor for a turbine, compressor, or the like normally operating in a particular temperature range, at least two axially spaced rotor elements each having a bladed rim section, and an intermediate spacing rotor element having a non-bladed rim section which forms the rotor surface between said bladed rim sections, said non-bladed rim section having axial slots extending radially inwards from a closed mouth at the periphery of the rim to accommodate thermal expansion of the rim, and in each of said slots an insert extending from the said mouth of the slot to the bottom at some point between the ends of the slot as a barrier blocking communication from one side of said non-bladed element to the other by way of the slot.

8. A turbine rotor as claimed in claim 7, said barrier insert comprising a grub screw entered depthwise into said slot and engaging a seating at the bottom thereof.

9. A turbine rotor as claimed in claim 7, having the slots keyholed at the bottom, a plug in the keyhole to cut off communication between opposite ends thereof, said barrier insert being seated on said plug.

10. A turbine rotor as claimed in claim 4 and sealing means extending depthwise into each of the slots to cut off lateral communication between their opposite ends, said sealing means comprising a grub screw entered depthwise into each slot and engaging a seating at the bottom thereof.

11. A turbine rotor as claimed in claim 4, each slot keyholed at the bottom, a plug in the keyhole to cut off communication between opposite ends thereof, and sealing means extending depthwise into the slot and seating on said plug to cut off lateral communication between opposite ends of said slot.

RODERICK CRISTALL McLEOD.

REFERENCES CITED

The following references are of record in the file of this patent:

UNITED STATES PATENTS

| Number | Name | Date |
| --- | --- | --- |
| 1,314,806 | Hirt | Sept. 2, 1919 |
| 1,534,716 | Junggren | Apr. 21, 1925 |
| 1,685,287 | McEvoy | Sept. 25, 1928 |
| 1,824,893 | Holzwarth | Sept. 29, 1931 |
| 1,932,278 | Lacey | Mar. 25, 1932 |
| 2,001,492 | Herrlinger | May 14, 1935 |
| 2,138,661 | Maxwell | Nov. 29, 1938 |
| 2,274,125 | Carney | Feb. 24, 1942 |
| 2,350,875 | Carney | June 6, 1944 |

FOREIGN PATENTS

| Number | Country | Date |
| --- | --- | --- |
| 567,962 | Great Britain | Mar. 9, 1945 |